Dec. 27, 1938.   P. R. SIMMONS   2,141,883
CONVEYER
Filed Feb. 15, 1937   2 Sheets-Sheet 1
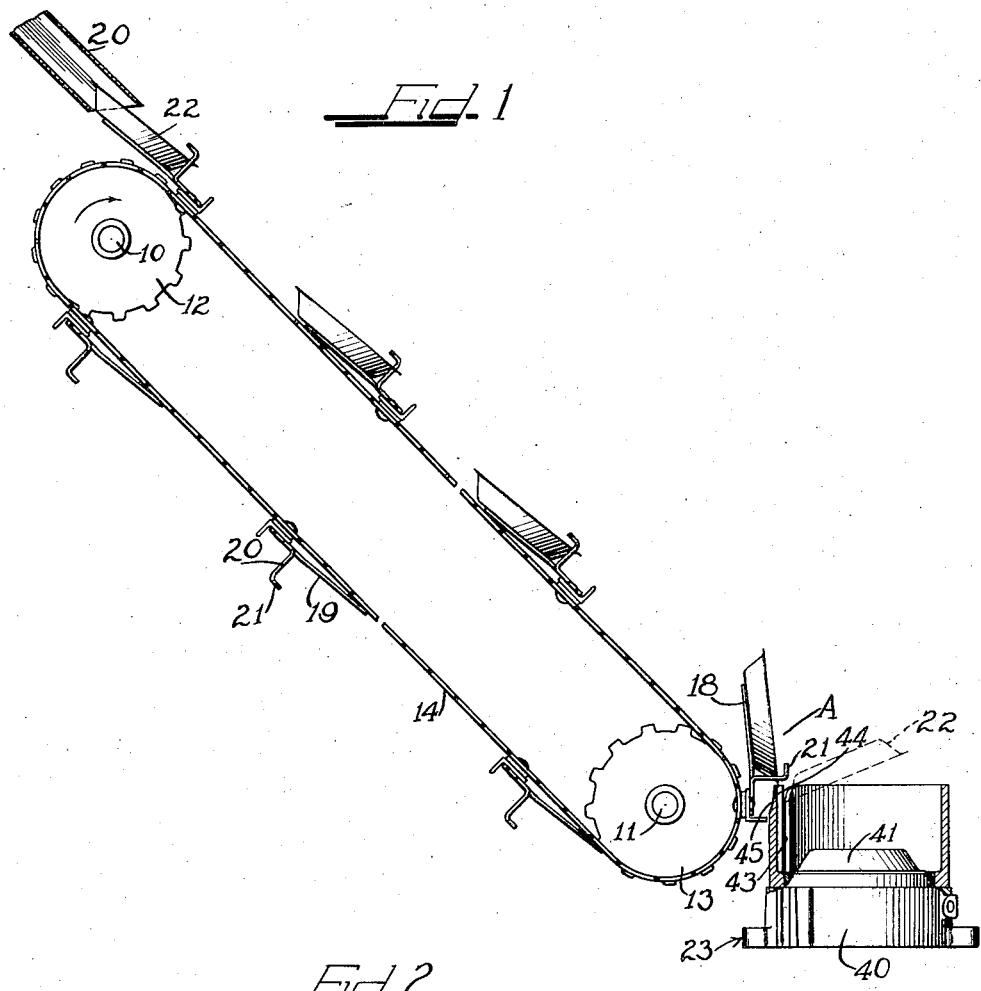
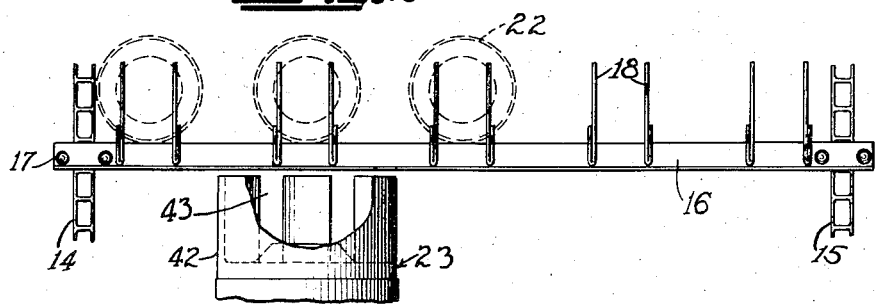
Paul R. Simmons Dec. 27, 1938.  P. R. SIMMONS  2,141,883
CONVEYER
Filed Feb. 15, 1937  2 Sheets-Sheet 2
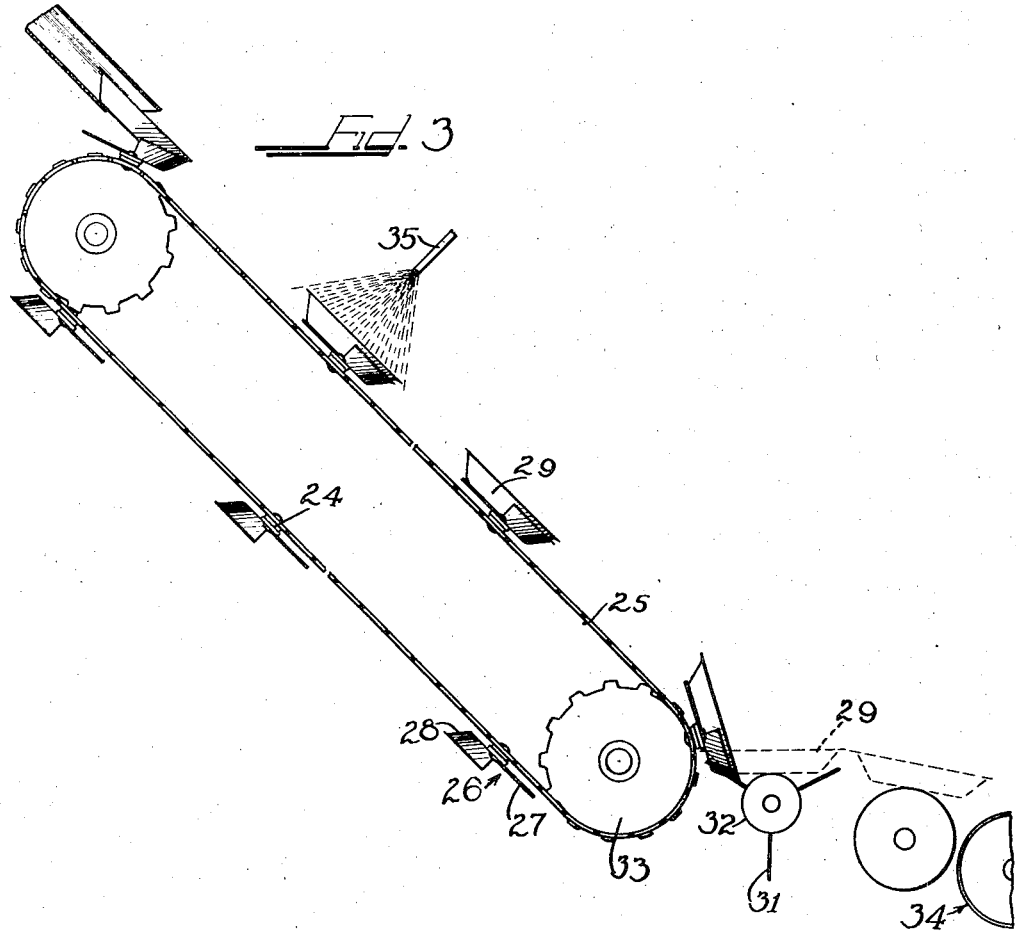
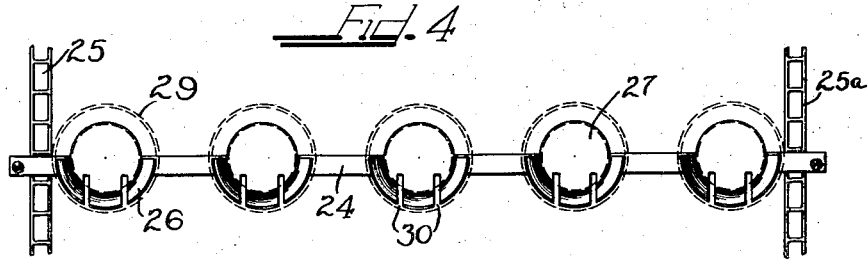
Inventor
PAUL R. SIMMONS Patented Dec. 27, 1938

2,141,883

UNITED STATES PATENT OFFICE 2,141,883

CONVEYER

Paul R. Simmons, Warsaw, Ind., assignor to Simmons Paper Products, Inc., Warsaw, Ind., a corporation of Indiana Application February 15, 1937, Serial No. 125,745

1 Claim. (Cl. 198—156)

This invention relates to a conveyer mechanism for conveying paper pie plates and the like from one station to another in the course of the manufacture of coated pie plates and the like.

The general type of apparatus to which my present invention pertains is described in my copending application entitled "Method of and apparatus for forming coated paper plates", Serial No. 69,063, filed March 16, 1936. As there shown, the plates are formed at an elevated station and the plates then transferred by means of a chute with properly timed stop mechanism to a station at a lower level where the coating operation is performed. The conveyer mechanism of my present invention provides a more satisfactory means for the transfer of the formed plates from the upper to the lower station.

It is therefore an important object of this invention to provide a conveyer mechanism for transferring pie plates and the like from one position to another and automatically discharging such pie plates.

Other and further important objects of this invention will be apparent from the disclosures in the specification and the accompanying drawings.

This invention (in a preferred form) is illustrated in the drawings and hereinafter more fully described.

On the drawings:

Figure 1 is a side elevational view of conveyer mechanism embodying the principles of my invention.

Figure 2 is a fragmentary top plan view of the same.

Figure 3 is a side elevational view of a modified form of conveyer mechanism.

Figure 4 is a fragmentary top plan view of the same.

As shown on the drawings:

The reference numerals 10 and 11 (Fig. 1) indicate respectively the upper and lower of a pair of shafts, on which are mounted sprocket wheels 12 and 13. One or both of the shafts 10 and 11 may be driven by any suitable means (not shown) in synchronism with the movement of other plate forming and plate coating mechanism with which the conveyer may be associated.

A pair of sprocket chains 14 and 15 are trained about the sprocket wheels 12 and 13. Bars 16 are secured at their ends, as by means of the bolt or rivet 17 to said sprocket chains 14 and 15 to extend transversely thereof. Each of the bars 16 carries a plurality of pairs of wire fingers 18 which serve to catch, support and discharge articles such as the pie plates 22, which are delivered to the conveyer, as from a chute 20.

Said fingers 18 comprise portions 19 that extend more or less parallel to the plane of the bar 16 to which they are secured, as by soldering, brazing or the like, and other portions 20 that stand out at right angles from the portions 19 and are provided with bent over ends 21 which overlie the lip or rim of the plate. The bottoms of the plates rest directly upon the portions 19 and the portions 20 serve to retain the plates thereon.

With the conveyer mechanism traveling as indicated by the arrow (Fig. 1), the fingers 19 of the plate receiving means 18 are successively brought into alignment with the chute 20 so that the pie plates 22 move onto the members 18 and are held thereon by the retaining portions 20. When the plates arrive at the lower end of the conveyer mechanism, the members 18 are up ended, as indicated at A, and the plates 22 are discharged onto an applicator 23 or other suitable receiving mechanism.

The applicator 23 comprises casting 40 through which a coating composition is conducted to a frusto-conical distributing head 41. A cylindrical shell 42, removably mounted on said casting 40, surrounds said head 41. Said shell 42 is provided with slots 43 that permit passage therethrough of the members 18 as the pie plates are delivered to said applicator 23.

To facilitate the delivery of the plates to the applicator, the latter is placed closely adjacent to the conveyer, so that as the members 18 flop each plate 22 over, as indicated in dotted lines Fig. 1, the rim of the plate is caught by the inner wall of the cylindrical shell 42, as at 44, and the plate caused to fall in inverted position onto the conforming head 41. The shell 42 is beveled at 45 to provide clearance for the bars 16 in passing the applicator.

In the modified form of conveyer mechanism illustrated in Figs. 3 and 4, a different form of plate receiving and supporting means is shown. Otherwise, the conveying mechanism is substantially the same as already described. A plurality of transversely extending bars 24 are secured at their ends to the sprocket chains 25 and 25a. Said bars 24 carry secured thereto a plurality of plate receiving and supporting means 26, each comprising a disk-like bottom portion 27 and a semi-circular rim portion 28 substantially conforming with the sloping walls of the pie plate 29 intended to be received and supported thereby.

Each of the plate receiving and supporting members 26 is provided with a pair of slots 30 to permit the passage therethrough of plate removing fingers 31 carried on a revolving spindle or shaft 32 and mounted adjacent the lower sprocket wheels 33. The spindle 32 carries three such fingers 31 arranged at angles of 120° apart, so that each pie plate 29 is delivered bottom down, as indicated in dotted lines (Fig. 3) onto a suitable conveying mechanism 34.

The form of conveyer mechanism as illustrated in Figs. 3 and 4 is particularly designed for use where the interior of the pie plates 29 are to be sprayed with a heat resistant coating or glaze, such as sodium silicate. A spray device 35 is conventionally illustrated. It will be understood that the driving mechanism for the conveyer and the valve mechanism for the spray device 35 may be suitably synchronized so that spraying occurs while the pie plates 29 are at rest. By means of the mechanism shown, the plates after being sprayed are not brought into contact with anything that would mar the glaze or coating, but are delivered to the conveyer 34 with the coating untouched. The conveyer 34 may deliver the coated plates to a drier or the like for drying and hardening the coating.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

The combination with an applicator having a slotted cylindrical wall, of a conveyer for plates and the like comprising a pair of endless traveling members, cross bars secured thereto and plate receiving and supporting means attached to said cross bars and having plate supporting and engaging fingers arranged to pass through the slots in said cylindrical wall and to cooperate with said wall to deliver said plates in inverted position onto said applicator.

PAUL R. SIMMONS.

CERTIFICATE OF CORRECTION.

Patent No. 2,141,883.　　　　　　　　　　　　　　　December 27, 1938.

PAUL R. SIMMONS.

It is hereby certified that the name of the assignee in the above numbered patent was erroneously described and specified as "Simmons Paper Products, Inc. whereas said name should have been described and specified as Purity Paper Products, Inc., as shown by the record of assignments in this office; and that the said Letters Patent should be read with this correction therein that the same may conform to the record of the case in the Patent Office.

Signed and sealed this 7th day of February, A.D. 1939.

Henry Van Arsdale.

(Seal)　　　　　　　　　　　　　　　　　　　　Acting Commissioner of Patents.